United States Patent [19]

Chviruk et al.

[11] 4,042,656
[45] Aug. 16, 1977

[54] GRAPHITE-BASE FILLING MATERIAL FOR THE DECOMPOSITION OF ALKALI METAL AMALGAMS AND METHOD OF PRODUCING SAME

[76] Inventors: Vladimir Petrovich Chviruk, ulitsa Tampere, 1, kv. 79; Nina Vasilievna Koneva, prospekt Nauki, 142/1, korpus 14, kv. 35/7; Alexandr Afanasievich Kilkinov, ulitsa Nikolaya Lebedeva, 3, kv. 38, all of Kiev; Alexandr Viktorovich Demin, ulitsa Pljuscheva, 18, korpus 2, kv. 105; Nikolai Nikolaevich Shipkov, ulitsa Moldogulovoi, 18, korpus 2, kv. 157, both of Moscow; Konstantin Alexeevich Kosinsky, ulitsa Uritskogo, 8, kv. 29, Ljubertsy; Georgy Mikirtychevich Kamarian, Kotelnicheskaya naberezhnaya, 25, korpus 8, kv. 45, Moscow; Ernest Elizarovich Nemirovsky, Zeleny prospekt, 11-a, kv. 19, Moscow; Igor Nikolaevich Samokhin, I Vladimirskaya, 8, kv. 7, Moscow, all of U.S.S.R.

[21] Appl. No.: 569,618

[22] Filed: Apr. 21, 1975

[51] Int. Cl.$^2$ ............................................. B29C 25/00
[52] U.S. Cl. .................................. 264/29.5; 252/503; 252/504; 252/507; 252/511; 204/294; 204/248; 204/99; 106/43; 106/56

[58] Field of Search ............... 252/510, 503, 504, 507; 204/294, 248; 264/345, 29.5

[56] References Cited

U.S. PATENT DOCUMENTS

| | | | |
|---|---|---|---|
| 3,054,166 | 9/1962 | Spendelow et al. | 252/504 X |
| 3,280,042 | 10/1966 | Bannikov et al. | 252/510 X |
| 3,684,745 | 8/1972 | Reichelt et al. | 252/507 |
| 3,875,039 | 4/1975 | Matusek et al. | 204/294 X |

*Primary Examiner*—Benjamin R. Padgett
*Assistant Examiner*—E. Suzanne Parr
*Attorney, Agent, or Firm*—Fleit & Jacobson

[57] ABSTRACT

A graphite-base filling material for the decomposition of alkali metal amalgams, said material containing titanium carbide and incorporating the ingredients in an amount between 69 and 35 wt % for the graphite and between 31 and 65 wt % for the titanium carbide.

The method of producing the material disclosed consists in that a carbon filler, a carbon-containing binding agent and titanium or titanium carbide or titanium oxide are intermixed. The titanium or said titanium compounds is used in an amount between 24.8 and 52 wt %, the titanium carbide or titanium oxide being taken in terms of titanium. The mixture obtained is moulded and the blanks moulded are fired at a temperature between 500° and 1200° C. Next, the blanks fired are graphitized at a temperature between 1700° and 1800° C.

10 Claims, No Drawings

GRAPHITE-BASE FILLING MATERIAL FOR THE DECOMPOSITION OF ALKALI METAL AMALGAMS AND METHOD OF PRODUCING SAME

The present invention relates to carbon materials, graphite included, and more specifically to a graphite-base filling material for the decomposition of alkali metal amalgams and to a method of producing same. The material may find application in electrolyte processes as a means of decomposing alkali metal amalgams in mercury cathode cells in the course of manufacturing alkalies.

Widely used for this purpose is graphite material. Also known is a graphite-base filling material containing metals and finding applications in the decomposition of alkali metal amalgams. The metals used, which are iron, nickel, cobalt and copper taken in an amount between 20 and 60 wt % intensify the process of amalgam decomposition.

For preparing said material, said metals or their carbides or oxides are intermixed with carbon-containing materials, the mixture so obtained is moulded and then heat-treated at a temperature up to 2800° C.

During the heat treatment of the filling material, the iron, nickel and cobalt form carbide phases which are metastable under the conditions the material is bound to operate and for this reason said additives are present in the material obtained in the form of metals. Copper forms no carbides.

If said filling material is used, the amalgam decomposes thereon at a rate which is higher than the rate of amalgam decomposition on the graphite-base filling material. But since metals are present in said material, it becomes unstable in alkalines after a protracted period in service and tends to amalgamate so that the effect of its use is of short duration and the reactivation of the material is practically impossible.

As far as the stability in alkalines and the activity in decomposing alkali metal amalgams are concerned, the effect is a more pronounced one when use is made of a graphite-base filling material containing titanium carbide in an amount between 6.3 and 25 wt % ("Tsvetnye metally" magazine, 1969, No. 7, page 63). The technique of preparing said material is similar to that adopted in the fabrication of electrodes, boiling down to mixing a carbon filler, say petroleum coke, a carbon-containing binding agent, say coal pitch, and titanium powder in an amount between 5 to 20 wt %, moulding the mixture so obtained, firing the blanks moulded at a temperature between 500° and 1200° C, and graphitizing said blanks at a temperature between 2200° and 2800° C. Yet, an inadequate titanium carbide content and high temperature of graphitizing said material, bringing about intensive dispersion of titanium carbide inclusions and a catalytic action of titanium carbide on the process of graphitizing, are factors due to which the activity of said material in decomposing alkali metal amalgams is low (some 2.5 to 3 A in terms of current) and the mechanical strength of packing is also low (somewhere between 200 and 500 kg/cm$^2$). Owing to this latter fact, the alkali product is contaminated with graphite dust so that filters need to be installed for additional purification of akali.

It is an object of the present invention to provide a graphite-base filling material displaying high activity in decomposing alkali metal amalgams.

Another object of the present invention is to provide a graphite-base filling material featuring high mechanical strength and stability in alkaline media.

A further object of the present invention is to provide a method for producing the graphite-base filling material enabling the fabrication of the material posing no problems in operation.

In accordance with said and other objects, the present invention provides a graphite-base filling material containing titanium carbide for the decomposition of alkali metal amalgams, the ingredients being present in the preparations ranging between 69 and 35 wt % of graphite and between 31 and 65 wt % of titanium carbide.

The invention also includes a method of producing the above described filling material wherein a carbon filler, a carbon-containing binding agent and titanium or titanium carbide or titanium oxide are intermixed, the titanium or said compounds of titanium being used in an amount between 24.8 and 52 wt % and the titanium carbide or titanium oxide being taken in terms of titanium; the mixture so obtained is moulded; the moulded blanks are fired at a temperature between 500° and 1200° C; and the resulting fired moulds are graphitized at a temperature between 1700° and 1800° C.

The graphite-base filling material for the decomposition of alkali metal amalgams disclosed in accordance with the invention has a number of advantages if compared with the known materials.

Unlike the known graphite-base filling material, the filling material of present invention exhibits high activity in decomposing alkali metal amalgams. Compared with the known materials containing titanium carbide, the present filling material increases the rate of amalgam decomposition almost four-fold, up to 10 or 11 A against 2.5-3 A if expressed in terms of current.

In addition the present filling material is absolutely stable in alkaline media, does not amalgamate, and displays a mechanical strength as high as 800 to 1200 kg/cm$^2$. This latter fact enables the production of alkalines uncontaminated with graphite dust.

Compared with graphite, which finds application as a packing for the decomposition of alkali metal amalgams, the material of the invention, if used in conjunction with mercury cathode cells for the production of alkalies, improves both the economy and performance of the cells to the extent that the volumetric current density increases from 250-300 A/l to 650-1000 A/l, the rate of sodium amalgam decomposition rises from 2.5-3 A to 10-11 A, the charge of mercury in an amalgam decomposer with a holding capacity of 500 l is reduced from 50 l to 20 l, and the height of the decomposer (the diameter is the same) and the weight of the filling material placed therein are reduced to only one-third of what was the case with graphite packing.

An increase in the titanium carbide content of the material is conductive to lowering the temperature at which the filling material is graphitized during the process of its manufacture. By virtue of this fact, it is possible to produce a graphite-base filling material of high mechanical strength and to increase the activity of material with the result that the decomposition of alkali metal amalgams takes place at a rate higher than ever before.

The method of producing a graphite-base filling material for the decomposition of alkali metal amalgams is carried out in the following way.

A carbon filler in powder form (petroleum coke, shale coke, graphite) taken in an amount between 15 and 45.2 wt. %, a carbon-containing binding agent (coal pitch, petroleum pitch, phenol-formaldehyde resins) in an amount between 18 and 30 wt. %, and titanium or titanium carbide or titanium oxide in powder form with a particle size of about from 40 to 250 microns used in an amount between 24.8 and 52.0 wt. %, the titanium carbide or titanium oxide being taken in terms of titanium, are intermixed in a mixer at a temperature of 100° C. It is preferred to use powdered titanium for the sole reason that the titanium in said form has a more pronounced effect on both the strength and activity of the material. Next, the mixture obtained is moulded into blanks of specified size and shape. For moulding, use is made of an automatic press, e.g., a pelletizer. The moulded blanks are fired, for example, in gas-heated or electrical furnaces at 500° to 1200° C for a period ranging between 30 and 400 hr. The fired blanks are graphitized, for instance, in resistance furnaces at 1700° to 1800° C for a period between 10 to 50 hr. The material so produced is used in vertical amalgam decomposers.

For the fabrication of the filling material used in horizontal amalgam decomposers, it is expedient to use graphite as the carbon filler, novolak phenol-formaldehyde resin taken in an amount of 19 wt % as the carbon-containing binding agent, and titanium powder in an amount between 24.8 and 52.0 wt %.

The mixture so obtained is extruded into bars of specified size on a continuous extruder, employing a heated die. Owing to the irreversible reaction of polymerization of the binding agent, products can be extruded in any shape which is not impaired during the firing at a later stage.

The present invention will be best understood from the following examples illustrating the way the graphite-base filling material for the decomposition of alkali metal amalgams is prepared.

EXAMPLE 1

A mixture comprising 45.2 wt % of slightly carbonized petroleum coke, 30 wt % of coal pitch and 24.8 wt % of titanium powder was intermixed at 100° C for 30 min, using a mixer. On cooling down to the ambient temperature, the mixture was reduced in size to particles measuring 0.1 mm and less, using a vibrating mill, and then it was moulded on an automatic rotary press developing a pressure of 1500 kg/cm². The moulded blanks were cylinders 10 mm in diameter and 10 mm high. The blanks were fired in a carbon-filled furnace heated by gas at a temperature of 1200° C for 150 hr. After the firing, the blanks were graphitized in a resistance furnace at 1700° C for 25 hr.

The material so produced contained 69 wt % of graphite and 31 wt % of titanium carbide and its mechanical strength was 1000 kg/cm². The filling material was tested under the conditions of decomposing sodium amalgam formed in mercury cathode cells during the process of manufacturing caustic soda. During the tests, the voluminous current density was 700 A/l compared with 250 A/l obtained when similar tests were carried out with the known graphite-base filling material containing 25 wt % of titanium carbide. For the material of the invention, the rate of sodium amalgam decomposition was 8.5 A in terms of current compared with 2.4 A commonly met with on the known packing. The alkali produced was highly transparent and the material showed no signs of amalgamation in the course of tests lasting a month.

EXAMPLE 2

A mixture comprising 32 wt % of petroleum coke, 28 wt % of coal pitch and 40 wt % of titanium powder was intermixed at 100° C for 40 min, using a mixer. On cooling down to the ambient temperature, the mixture was reduced in size to particles measuring 0.1 mm and less, using a vibration mill, and then was moulded on an automatic rotary press developing a pressure of 1650 kg/cm². The moulded blanks were rings with an outside diameter of 10 mm, and inside diameter of 5 mm and 10 mm high. The blanks were fired in a carbon-filled electrically-heated furnace at a temperature of 800° C for 30 hr. After the firing, the blanks were graphitized in a resistance furnace at 1800° C for 10 hr.

The filling material so produced contained 50 wt % of graphite and 50 wt % of titanium carbide and its mechanical strength was 1100 kg/cm². The tests of the material under a current load of 50 KA had revealed that when the concentration of weak sodium amalgam is under 0 00001% the voluminous current density was 1000 A/l compared with 250 A/l which was the voluminous current density for the known graphite packing. Under the conditions of testing similar to those described in Example 1, the rate of sodium amalgam decomposition was 11 A or, in other words 4.5 times the rate of decomposition on the known packing containing 25 wt % of titanium carbide.

EXAMPLE 3

A mixture prepared in the same way as outlined in Example 1 and comprising 29 wt % of graphite with particles measuring 0.5 mm and less, 19 wt % of novolak phenol-formaldehyde resin with urotropine as the hardener and 52 wt % of titanium powder was moulded on an intermittently operating press at a temperature of 160° to 170° C and under a pressure between 90 and 100 kg/cm². The moulded blanks measured 120 mm by 20 mm by 650 mm. The firing and graphitization were accomplished on the same lines as in Example 1.

The filling material contained 35 wt % of graphite and 65 wt % of titanium carbide, and its mechanical strength was 1200 kg/cm². During the test under the conditions similar to those of Example 1, the rate of sodium amalgam decomposition was 8.7 A. The material exhibited stability in alkali and did not amalgamate.

EXAMPLE 4

A mixture prepared from 33 wt % of petroleum coke, 30 wt % of coal pitch and 37 wt % of titanium carbide (29.6 wt % in terms of titanium) in the same way as illustrated in Example 1 was moulded on an automatic press developing a pressure of 2000 kg/cm². The moulded blanks were cylinders 10 mm in diameter and 10 mm high. The firing and graphitization of the blanks were carried out as outlined in Example 1.

The filling material produced contained 63 wt % of graphite and 37 wt % of titanium carbide, and its mechanical strength was 900 kg/cm². The material was tested under the conditions of decomposing strong potassium amalgam with a concentration of 0.4%. The voluminous current density under said conditions was 650 A/l and the concentration of weak potassium amalgam was 0.0001%. The caustic soda produced was 48% strong. A graphite packing tested under the same conditions gave a voluminous current density of maximum 200 A/l whereas the concentration of weak potassium amalgam was 0.1%.

EXAMPLE 5

A mixture prepared in the same way as indicated in Example 1 and comprising 32 wt % of petroleum coke, 18 wt % of coal pitch and 50 wt % of titanium oxide (35 wt % in terms of titanium) was moulded on an automatic press under a pressure of 1500 kg/cm$^2$. The moulded blanks were cylinders 7 mm in diameter and 7 mm high which were then fired and graphitized as outlined in Example 1.

The filling material produced contained 56.2 wt % of graphite and 43.8 wt % of titanium carbide, and its mechanical strength was 950 kg/cm$^2$.

Under the conditions of testing similar to those which took place in Example 1, the rate of sodium amalgam decomposition was 9.2 A. The material displayed stability in amalgam and did not amalgamate. The alkali produced was transparent.

EXAMPLE 6

A mixture prepared from 20 wt % of slightly carbonized petroleum coke, 30 wt % of coal pitch and 50 wt % of titanium carbide (40 wt % in terms of titanium) in the same way as outlined in Example 1 was moulded under a pressure of 1500 kg/cm$^2$, using an automatic rotary press. The moulded blanks were cylinders 10 mm in diameter and 10 mm high which were fired in an electrical furnace at 1000° C for 32 hr. Next, the fired blanks were graphitized in a resistance furnace at 1800° C.

The filling material produced contained 50 wt % of titanium carbide and 50 wt % of graphite, and its mechanical strength was 950 kg/cm$^2$. The tests had revealed that the rate of sodium amalgam decomposition was 9.3 A compared with 2.4 A obtained with the known material.

EXAMPLE 7

A mixture prepared from 15 wt % of petroleum coke, 20 wt % of coal pitch and 65 wt % of titanium carbide (52 wt % in terms of titanium) in the same way as outlined in Example 1 was moulded under a pressure of 2000 kg/cm$^2$, using an automatic rotary press. The blanks were fired in a gas-heated furnace at 1200° C for 400 hr. The fired blanks were graphitized at 1700° C for 10 hr.

The filling material produced contained 65 wt % of titanium carbide and 35 wt % of graphite and during the test exhibited a rate of sodium amalgam decomposition of 9.4 A under the conditions identical to previous tests. The mechanical strength of the material was 900 kg/cm$^2$.

EXAMPLE 8

A mixture prepared from 40 wt % of petroleum coke, 20 wt % of coal pitch and 40 wt % of titanium oxide (28 wt % in terms of titanium) in the same way as outlined in Example 5 was moulded under a pressure of 1700 kg/cm$^2$, using an automatic press. The moulded blanks were cylinders 7 mm in diameter and 7 mm high which were fired under a temperature of 1000° C for 35 hr. The temperature of graphitization was 1800° C.

The filling material so produced contained 35 wt % of titanium carbide and 65 wt % of graphite, and its mechanical strength was 880 kg/cm$^2$. Under the conditions of testing which were similar to those of Example 1, the rate of sodium amalgam decomposition was 8.7 A. The material was stable in alkali and failed to amalgamate.

EXAMPLE 9

A mixture prepared from 20 wt % of petroleum coke, 20 wt % of coal pitch and 60 wt % of titanium oxide (42 wt % in terms of titanium) in the same way as outlined in Example 5 was moulded under a pressure of 2000 kg/cm$^2$ into rings 7 mm high and with an outside and inside diameter of 10 and 6 mm, respectively, using an automatic press. The process of firing and graphitizing was the same as in Example 1.

The filling material produced contained 52.2 wt % of titanium carbide and 47.5 wt % of graphite, and its strength was 800 kg/cm$^2$. Under the conditions of testing similar to those of Example 1, the rate of sodium amalgam decomposition was 9.2 A. The material was stable in alkali and failed to amalgamate.

What is claimed is:

1. A method of producing a graphite-base filling material for the decomposition of alkali metal amalgams and containing between 69 and 35 weight percent of graphite and between 31 and 65 weight percent of titanium carbide, comprising forming a mixture at a temperature of about 100° C containing a carbon filler in powder form, selected from the group consisting of petroleum coke, shale coke, and graphite, and in an amount ranging between 15 and 45.2 weight percent, a carbon-containing binding agent selected from the group consisting of coal pitch, petroleum pitch, and phenol-formaldehyde resin in an amount ranging between 18 and 30 weight percent, and a titanium substance selected from the group consisting of titanium, titanium carbide, and titanium oxide, said titanium substance being in the form of a powder having a particle size of about from 40 to 250 microns and being employed in an amount ranging between 24.8 and 52.0 weight percent based on the amount of titanium present, moulding the resulting mixture into blanks of a desired size and shape, firing the thus-moulded blanks at a temperature of about from 500° to 1200° C for a period of time between 30 and 400 hours, and graphitizing the resulting fired blanks at a temperature of about from 1700° to 1800° C for a period of time between 10 and 50 hours.

2. The method of claim 1 wherein the carbon filler is petroleum coke.

3. The method of claim 1 wherein the carbon filler is shale coke.

4. The method of claim 1 wherein the carbon filler is graphite.

5. The method of claim 1 wherein the binding agent is coal pitch.

6. The method of claim 1 wherein the binding agent is petroleum pitch.

7. The method of claim 1 wherein the binding agent is phenol-formaldehyde resin.

8. The method of claim 1 wherein the titanium substance is titanium.

9. The method of claim 1 wherein the titanium substance is titanium carbide.

10. The method of claim 1 wherein the titanium substance is titanium oxide.

* * * * *